United States Patent [19]

Kunert

[11] 3,853,265

[45] Dec. 10, 1974

[54] NOMOGRAM TYPE CALCULATOR SLIDABLE RULE

[76] Inventor: Heinz Kunert, Belvederestrasse 155, Cologne, Germany

[22] Filed: Aug. 8, 1973

[21] Appl. No.: 386,501

[52] U.S. Cl. .............................. 235/89 R, 235/70 R
[51] Int. Cl. ............................................. G06c 3/00
[58] Field of Search .................. 235/89 R, 70 R, 88

[56] References Cited
UNITED STATES PATENTS

| | | | |
|---|---|---|---|
| 2,673,413 | 3/1954 | Weber | 235/89 R |
| 2,685,410 | 8/1954 | Rondthaler | 235/89 R |
| 3,011,854 | 12/1961 | Allen | 346/21 |
| 3,130,905 | 4/1964 | Hsiao | 235/89 R |
| 3,266,721 | 8/1966 | Barron | 235/89 R |
| 3,514,582 | 5/1970 | Sanderson | 235/89 R |

*Primary Examiner*—Steven J. Tomsky
*Attorney, Agent, or Firm*—Cameron, Kerkam, Sutton, Stowell & Stowell

[57] ABSTRACT

A slidable nomograph device having an erasable and slidable rule moved beneath a plurality of partially transparent nomograph fields, charts, curves, etc. The user writes on the rule surface by (pressure) writing on the fixed nomograph fields and the writing is moved from one nomograph field to the next, and so on. Different nomograph fields may be used by sliding out one field set and substituting another field set.

4 Claims, 7 Drawing Figures

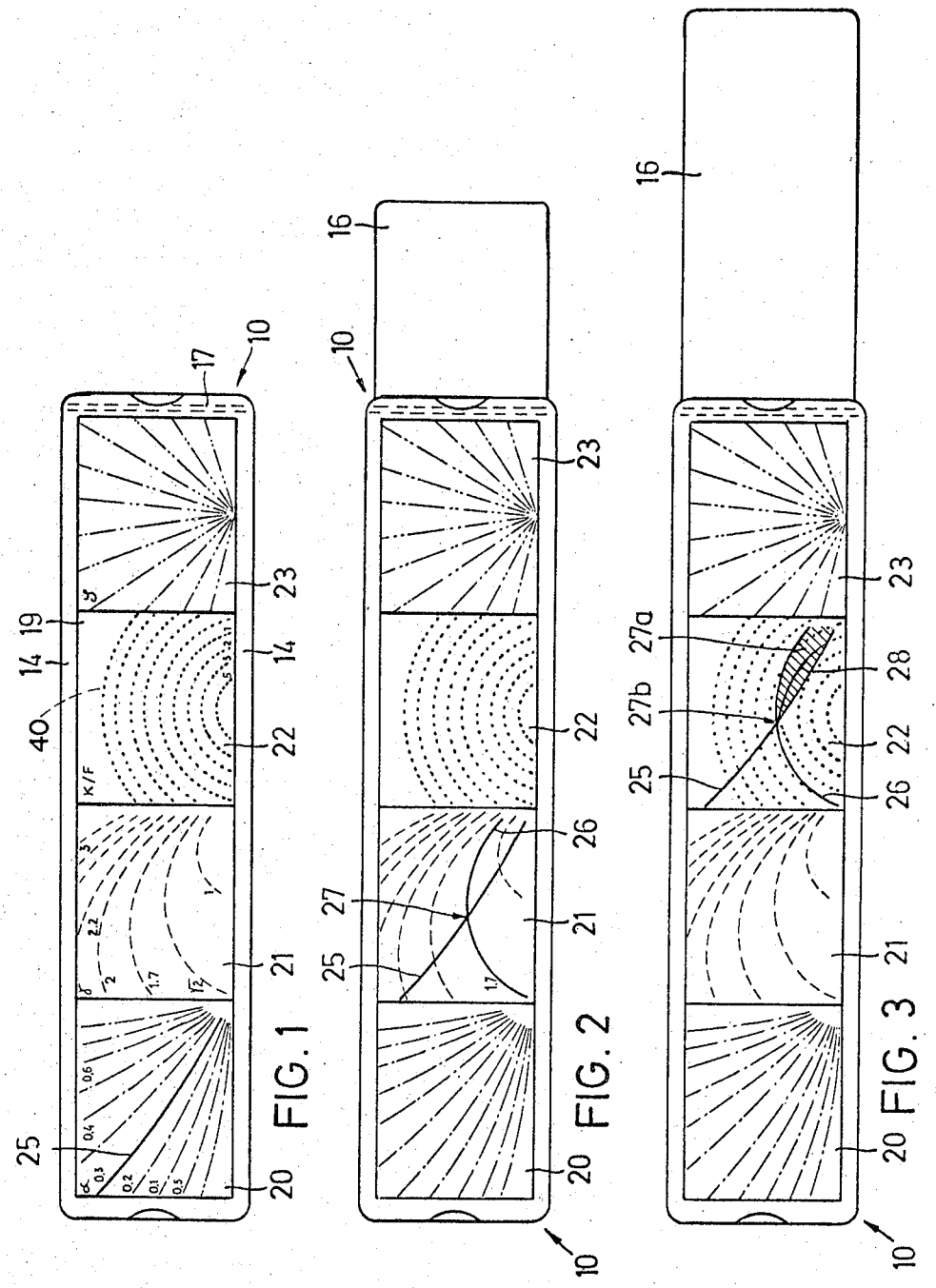

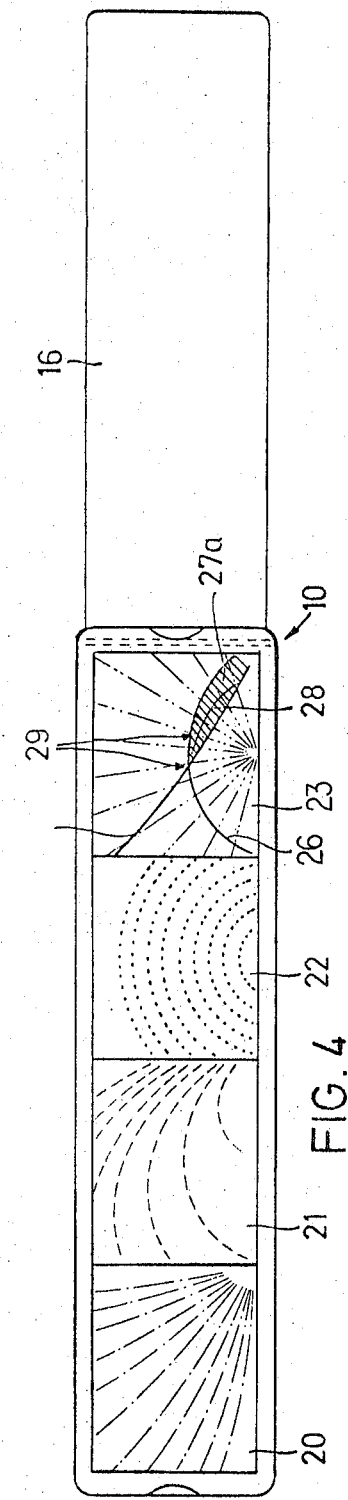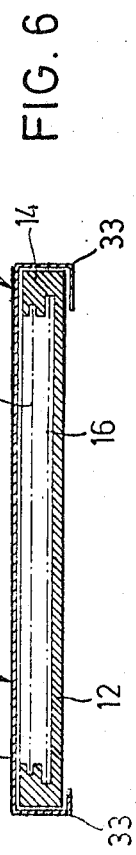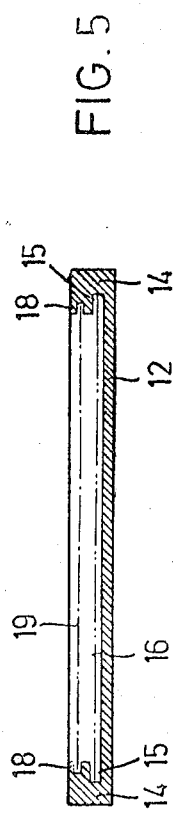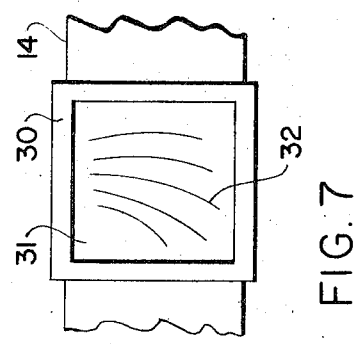

NOMOGRAM TYPE CALCULATOR SLIDABLE RULE

This invention relates to a nomograph device for the compilation of several data which are related to one another and which are definable by virtue of their geometrical position in a plane.

Nomography is the representation of natural or mathematical laws graphically in such a way that these representations can be used as calculating aids. In this manner, a diagram or graph replaces an equation or a mathematical relation and makes possible, as a consequence of the pictorial visibility, rapid determination of a proper reference magnitude from given input variables. The graphic representation, the so-called nomogram, thus represents a computer technical aid. In comparison with numerical tabular compilations, which include, for example, the slide rule, the reading off precision of nomograms (if one assumes a manipulable measure of the nomographic representation) is admittedly somewhat worse, but this is often outweighed by the advantage of facile representation of the functional relations attendant nomograms. While the use of tables, i.e., slide rules, often requires a high measure of skill, the functional relation and the significance of the individual calculation operations in the case of nomographic calculations remains visible to the operator during the entire course of the claculating operation. This is greatly advantageous for several reasons: errors during the calculation procedure are recognized much more easily and much earlier, because the intermediate results can already be recognized as incorrect. However, the course of the calculation is also more interesting. A special advantage of the graphic illustration of the functional relations can also be viewed from a pedagogic aspect. The mathematical functions are recognized immediately as illustrations of mathematical interrelationships, and their variability and limitations for use in, for instance, engineering, are immediately grasped. Functional thinking and the comprehension of logical relations are promoted.

The invention is a device which renders possible the determination of solutions or optimal values from several data existing in relation to one another. Accordingly, if occasion arises, a steplike or approximation approach to the solution is also possible. For example, in the case of the determination of a solution or optimal value from several functions (curves) the functional relation and therefore the significance of the individual data remain recognizable to the user of the device.

The invention is embodied in a device which facilitates the nomographic solution of calculation procedures, as well as simplifying them, and which, in comparison with hitherto employed charts, makes the calculation operations readily understood. With the device of the invention, such claculating operations can be carried out by means of a simple mechanical action, and thereby, even in comparison with the conventional curve charts, the functional relation and the significance of the processed values can be constantly observed.

This is realized by means of a number of data carrying fields or regions arranged along the device and an inscribable and erasable rule for the entry of data thereon. The rule and the data carrying the fields are movable relative to one another and may thus be brought into congruence with one another. The rule and the data carrying fields may both be at least partially transparent for the purpose of a reading in the case they are superposed.

In the example given here, the invention provides for the separate arrangement of various functions, which in the case of conventional curve charts are usually compiled in one table or page. It also provides for an inscribable and erasable rule arranged movably relative to the data carrying fields. Individual curves or the like can be transposed from the data carrying fields to the rule and then brought into coincidence with the other data carrying fields, and further data, curves, etc., are entered into the rule, so that at the conclusion of the process the sought solution can be read.

Basically, the inscribable and erasable rule is a memory storage device for information which can be introduced for further processing or evaluation into additional fields with corresponding characteristics. The data contained in the data carrying fields can be graphic characters of a symbolic nature, writing characters, such as numerical characters, symbols with the nature of an object, characters with their own symbol nature and significance, as well as graphic symbols such as periods, dashes, curves and configurations, which exist in relation to a defined field or a defined plane, for example to a coordinate system. Writing symbols or numerical symbols, too, can receive information values, by means of corresponding entries into a field, that are supplemental to this field, or, within a defined system, to each other (numerical matrices).

Thus with the device of the invention, a great number of problems arising in engineering or economics, for instance functional equations with four or more variables, can be solved clearly, easily and quickly, with considerable accuracy. For the solution of functional equations with four or more variables, conventional nomographic calculation processes require combined curve charts or interconnection charts or combinations of function curves with conducting tables, which are often not clear and thus easily lead to errors in reading. Two important advantages of the invention, namely, the surveyability of the interior relations during the total operational procedure and its pedagogic effects, have already been mentioned. Because of the motor action of the input and the carry-over of basic functions into further data carrying fields, the functional structure of a mathematical formula is grasped more easily in a visible and operational way. The use of an input table that can be inscribed repeatedly and easily erased as necessary, offers, in this connection, a further advantage over conventional curve charts. Here functions can be entered and can then be verified and evaluated. In this way, various solution possibilities of practical problems can be found experimentally or approximately in a very short time.

In addition to the use of the device of the invention as a calculating aid in the realm of nomographic calculation, further possibilities of application exist, e.g., in the case of graphic solution of equations, in various problems of graphic statistics, in the case of graphic integration and differentiation (for instance in the case of the graphic solution of an integral by plotting of a countable plane field). In general, it can be said that the invention is applicable whenever there is data storage of information in a first stage of operation by means of entry of symbols into a plane diagram and of correcting, evaluating or completing them in a second stage of operation with the aid of other or additional arrangement diagrams. Other application possibilities exist in the realm of social games or contest games. This applies especially to games involving two or more people, whereby the players enter solution suggestions into the appropriate entry fields either in mutual dependence or co-operatively, and then have the opportunity of finding optimal strategies by means of an appropriate comparison of these solution suggestions with the help of certain criteria, which are presupposed on the data carrying fields.

The invention will now be described further in relation to an example of operation which is represented in the attached drawings, and concerns a device for the visible representation of functional relations between four variables and for the evaluation of such an equation.

IN THE DRAWINGS:

FIG. 1 is a view of the selected example of operation of the device of the invention.

FIGS. 2 to 4 are plan views of the device according to FIG. 1 in various sequential usage phases.

FIG. 5 is a cross-section of the device represented in FIGS. 1 through 4.

FIG. 6 is a view similar to FIG. 5, showing an embodiment.

FIG. 7 is a top view of FIG. 6.

In the represented example of operation, the nomograph device designated by 10 consists of a rectangular base 12, which has on both longitudinal edges a ledge 14 which rises above the upper face of base. The base and ledges constitute a frame. Ledges 14 are provided with guide grooves 15 adjacent base 12. An imprintable and erasable table or rule 16 is slidably arranged in grooves 15. This rule includes several superimposed sheets. When one writes on them with a pointed pencil, a corresponding line appears because the sheets cling to one another. This line can then be erased by separating the two sheets, which can be done, for example, by means of a sheet-metal strip introduced between them. An example of such an erasable surface is shown in U.S. Pat. No. 3,011,854 to Allen. The superimposed sheets may be of that type shown in said Allen patent, i.e., of transparent plastic and of waxy paraffin. Other specific types of imprintable and rapidly erasable rules are also applicable. As can be seen from FIGS. 2 through 4, the rule 16 can be pulled out sideways from either end of guide grooves 15. The strip 17 that erases the rule by separating the sheets can be arranged between ledges 14 on one end of device 10 so that when the rule is pulled out it is erased. The erasing strip 17 is between the layers of the superimposed sheets, one layer being on top and the other layer on the bottom of the strip.

Other grooves 18 are provided on ledges 14 in which a transparent plate or sheet 19 is removably placed. This plate or sheet 19 has four data carrying fields or nomographs 20, 21, 22, 23 on which data are stored in relation to one another. In the case of the illustrated example, these data consist of sets of curves or diagrams representing certain functional values with known theoretical relationship, such as an equation with four variables. The data are imprinted on fields 20 through 23. The plate or sheet 19 can also be provided with perforations or automatic punches corresponding to the data contained in the data carrying fields, for the purpose of facilitating the transposition of the data to rule 16. The sheet may be of thin plastic on which pressure writing by a stylus is transferred to rule 16.

In using the device 10, one transfers, while the rule is inserted all the way, one of the curves of the first data carrying field 20, for example curve 25, onto rule 16 by tracing the curve with a pencil. A more precise entry is effected by a perforated or punched construction of plate or sheet 19. Such perforations are designated by the numeral 40 and define the elements of data field 22, for example. Then the rule is pushed out on the right, as seen in FIG. 2, so that the curve 25 now lies within the set of curves of the data carrying field 21. Now one of the curves of the data carrying field 21, for example curve 26, is transferred to the rule by writing on the field 21. Let it be assumed that from these two curves 25 and 26 a point of intersection 27 results, which represents an intermediate solution, or perhaps a region 27a, within which the solution or optimal value must lie. The table 16 is thereupon shifted as shown in FIG. 3, until this field 27 lies beneath (third) data carrying field 22. Here, for example, the common point of intersection 27b of three reference magnitudes can be found, or perhaps a reference magnitude presupposed from that set of curves, such as curve 28, are transferred to the table 16, so that functional relations can be examined approximately. Finally, rule 16 can be pulled out farther, as shown at FIG. 4, until the entered curves 25, 26 or 28 lie under (fourth) data carrying field 23, which contains other reference magnitudes in the form of a set of curves or a relevant coordinate system, so that additional and expanded solution points, such as those designated by 29, are found from common points of intersection with curves of this data carrying field 23.

It can be seen that in this way single variables and approximation solutions of complicated equations can be found or represented quickly and simply. When the rule 16 is pulled out toward the right from the position shown in FIG. 4, the separation strip 17 erases the entries, and a new operatioon can begin.

In the case described it is assumed that rule 16 is movable and the plate or sheet 19 fixed. Instead of this, rule 16 can be fixed and plate or sheet 19 movable, or rule 16 and the plate or sheet 19 both movable toward each other in relation to the base plate 12. If need be, the upper side of the base plate 12 can also be at least partially transparent.

To use device 10 for the solution of other types of equations, the plate or sheet 19 is movable from grooves 18, so that one can insert various plates or sheets 19 with differing data on the individual fields or regions 20-23.

According to the embodiment of FIG. 6, a movable slider can be carried by the base 12. This slider 30 consists of a transparent plate 31 having curved finger extensions 33 for engaging the longitudinal edges of base 12. Plate 31 may carry another data field 32, which can contain a still different coordinate system in which appropriate solution points of solution fields can be observed.

The data present in the data fields need not be curves, but may include data of all sorts. Also, the shifting between the data carrying fields and the table need by no means be rectilineal, i.e., circular rules are contemplated, with the rule 16 being circular and the fields 20-23 being circumferentially arranged.

What is claimed is:

1. In a nomogram calculating device of the type wherein a stylus point is pressed onto a transparent sheet and the pressure of the stylus point is transmitted through the transparent sheet onto a tacky, waxy surface layer of paraffin touching and immediately below said sheet to thereby form an image on the paraffin of the path taken by the stylus point, and wherein the image may be removed from the waxy surface layer by separation of said transparent sheet from said waxy surface layer, for the formation of subsequent images on different as well as the same areas of the waxy paraffin layer, the improvement comprising, a. a plurality of spaced data fields carried by a frame and stored on a plate above, parallel, and contiguous to said transparent sheet,
   b. means for mounting said waxy paraffin layer and said transparent sheet in said frame for sliding movement relative to said data fields, so that at least one zone of said paraffin layer is capable of being sequentially superposed beneath and with respect to each of said data fields,
   c. whereby a tracing on the waxy paraffin layer corresponding to the tracing of one data field may be superposed with respect to another data field,
   d. an erasing bar positioned between the transparent sheet and the waxy paraffin layer, said erasing bar carried by and mounted on said frame, the erasing bar and the waxy paraffin layer being relatively movable, to thereby separate the transparent sheet from the waxy paraffin layer upon relative movement of the erasing bar and paraffin layer and thereby erase any images thereon.

2. The device of claim 1 wherein said transparent sheet and waxy paraffin layer are rectangular and are carried by a rectangular frame, and wherein said erasing bar is mounted at one end of said frame.

3. The device of claim 1 including a slider that embraces the rectangular frame and slides therealong and carries a second plate having a data field thereon, said second data plate being transparent and positioned so that the data fields carried by the first-mentioned data plate are visible through said second plate.

4. The device of claim 1 wherein at least some of the elements of the data field include perforations.

* * * * *